No. 765,267. PATENTED JULY 19, 1904.
C. B. BISHOP.
MACHINE FOR MAKING CUT GLASS.
APPLICATION FILED DEC. 24, 1903.
NO MODEL.
2 SHEETS—SHEET 1.
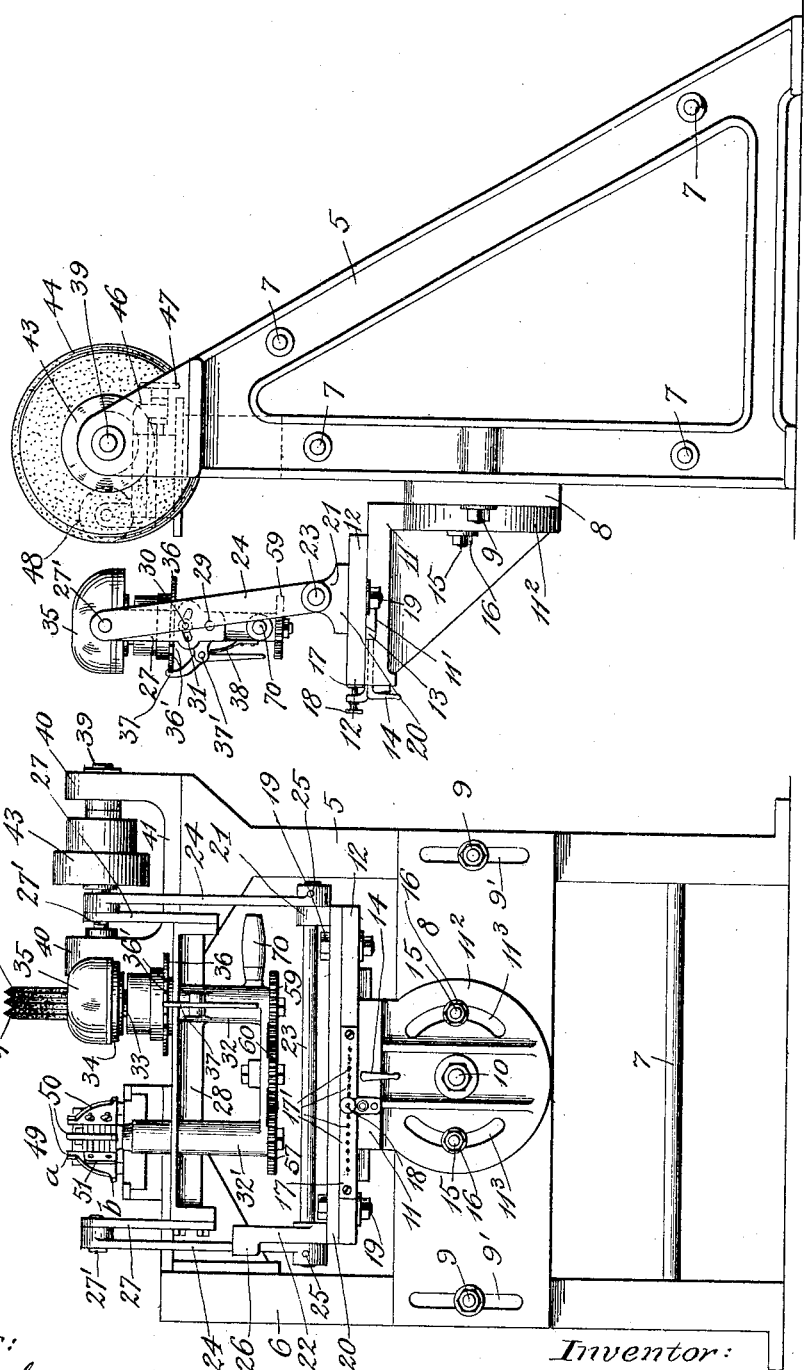
Witnesses:
Inventor:
C. B. Bishop,
By his Attorney No. 765,267. PATENTED JULY 19, 1904.
C. B. BISHOP.
MACHINE FOR MAKING CUT GLASS.
APPLICATION FILED DEC. 24, 1903.
NO MODEL. 2 SHEETS—SHEET 2.
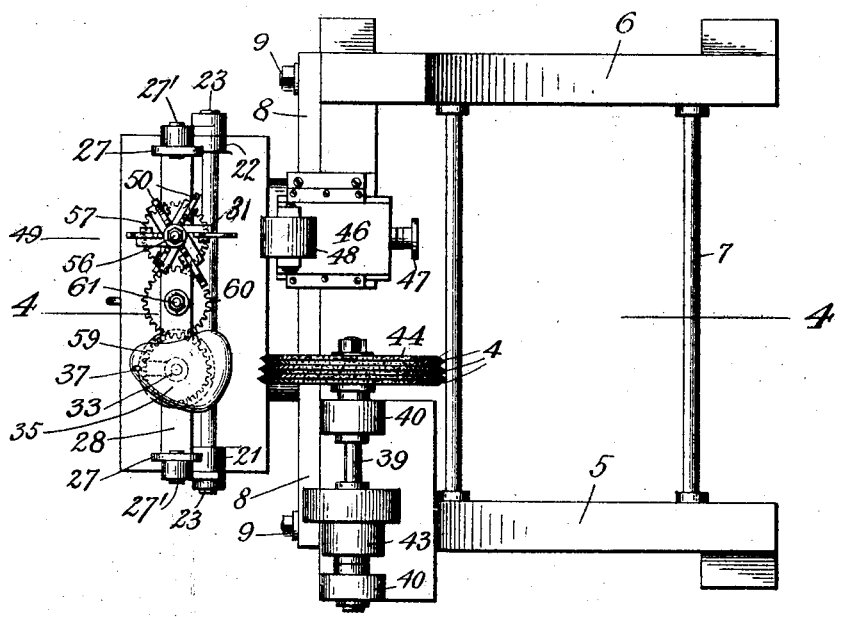
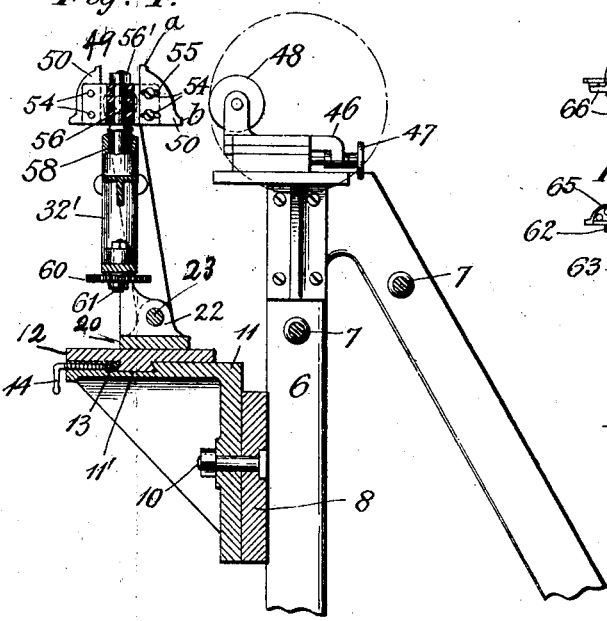
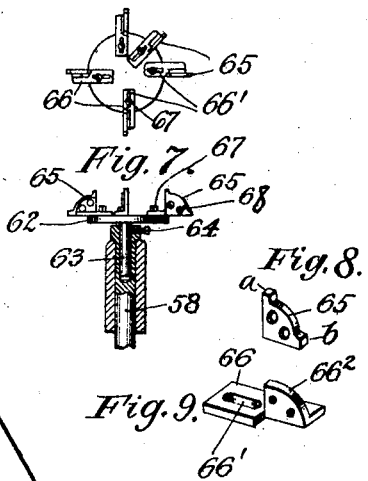
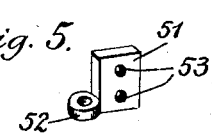
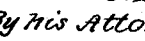
Witnesses:
Inventor:
C. B. Bishop,
By his Attorney No. 765,267.

Patented July 19, 1904.

UNITED STATES PATENT OFFICE.

CHARLES B. BISHOP, OF NEW BRITAIN, CONNECTICUT.

MACHINE FOR MAKING CUT GLASS.

SPECIFICATION forming part of Letters Patent No. 765,267, dated July 19, 1904.

Application filed December 24, 1903. Serial No. 186,463. (No model.)

*To all whom it may concern:*

Be it known that I, CHARLES B. BISHOP, a citizen of the United States of America, residing at New Britain, in the county of Hartford and State of Connecticut, have invented certain new and useful Improvements in Machines for Making Cut Glass, of which the following is a specification.

My invention relates to machines for making cut glass, and has for its object the provision of mechanism for carrying out this work in a quick and reliable manner and for producing simultaneously a number of cuts in the material.

A further object of the invention is the provision of a plurality of formers mounted upon one and the same carrier whereby designs of any desired character may be formed in the work, each former controlling the formation of a part of the design.

A further object of the invention is the provision of a plurality of interchangeable formers, each controlling the formation of part of the design and all mounted on the same carrier.

A further object of the invention is the provision of a number of adjustable formers mounted on the same carrier, in virtue of which the cuts on various sizes of articles may be controlled.

My invention comprises additional improvements applied to the machine set forth and described in my application filed July 25, 1903, Serial No. 166,995.

In the accompanying drawings, Figure 1 is a front view of a machine embodying the present improvements. Fig. 2 is a side view thereof looking from the right. Fig. 3 is a plan view. Fig. 4 is a section on line 4 4 of Fig. 3. Fig. 5 is a perspective view of one of the former or pattern supports. Figs. 6, 7, 8, and 9 are views of a modification hereinafter described.

Like characterss designate similar parts throughout the several views.

Referring to the drawings, the machine is shown comprising side frames 5 and 6, united by tie-rods 7.

Designated by the numeral 8 is a plate which unites the side frames 5 and 6 and is connected thereto by bolts 9, fitted in slots 9', and pivoted to this plate by a bolt 10 is a knee 11, which is longitudinally grooved at 11' for the reception of a tongue on a cross-slide 12, said tongue being clamped in position after adjustment by a gib 13, actuated by a hand-screw 14, as shown in Figs. 2 and 4.

Constituting a part of the knee 11 is a substantially circular plate $11^2$, which is pivoted on the bolt 10 and is provided with curved slots $11^3$ for the reception of bolts 15, carrying nuts 16, in virtue of which the plate and the parts supported thereby and hereinafter described may be adjusted on the pivot-bolt 10 and then clamped firmly in position.

Secured to slide 12 is a plate 17, having a series of apertures 17', and when the screw 14 is loosened said slide 12 may be moved longitudinally to bring any one of the apertures opposite a spring-actuated stop-pin or plunger 18, as set forth in my application aforesaid.

Attached to the slide 12 by bolts 19 is a plate 20, said bolts fitting in transverse slots in the slide, whereby an angular adjustment of the same may be obtained, as in my application aforesaid. Plate 20 is provided with standards 21 22, in which are formed bearings for a rock-shaft 23, each end of which carries an arm 24, secured thereto by a pin 25 or otherwise, so that the arms will move in unison. A stop 26, rising from a bearing 22, limits the backward movement of said arms by engagement with one of them.

Pivoted at 27' to and depending from the upper ends of the arms 24 are links 27 27', the lower ends of which are secured to a cross-plate 28, pivoted at 29 upon the links, as illustrated in Fig. 2. Bolts 30 pass through slots 31 of the links and serve to secure the parts together with a capability of adjustment in the arc of a circle.

As illustrated in Fig. 1, the cross-plate 28 is provided with a bearing 32 for the reception of an arbor 33, the upper end of which has a head 34, upon which the blanks 35 to be ornamented are secured in any desired way, and any form of chuck may be employed for this purpose—for instance, that set forth in my application above mentioned.

For holding the arbor 33 and the blank 35 secured thereto against rotation during each cutting operation an index-plate 36 is provided, said plate being secured to the head 34 in any desired way. The periphery of this plate is provided with a series of notches 36' corresponding to the spacing of the cuts to be produced in the blank, and these notches are adapted to be engaged by a detent 37, pivoted at 37' to the bearing 32, said detent being actuated by a spring 38. This detent is in the form of a lever, and it may be disengaged from any of the notches by pressing upon the lower part thereof, as will be readily understood and as fully set forth in my application aforesaid. Designated by 39 is an arbor which is journaled in bearings 40 of a head 41, the latter being secured on the frame 5 in the usual manner. On shaft 39 is a cone-pulley 43, which may be driven at any desired speed by a belt applied thereto, and also clamped to said shaft is a tool 44, composed in this instance of a number of sections, each of which makes an individual cut in the blank 35. This tool is shown as composed of a series of grinding-disks 4, and although these disks are illustrated as clamped tightly together they may be separated, if desired, to enable any required space to be made between the cuts.

Designated by 46 is a slide which may be adjusted back and forth by screw 47, and in bearings of this slide is journaled a wide roller 48 for coöperation with the former in use, as will be hereinafter described.

For producing any desired design upon the blank to be cut I employ in the present instance a series of formers, each of which conforms in outline to the portion of the design which it represents and to be reproduced by the cutting-tool upon the blank, and to afford the saving of time in making the cuts the tool is composed of several implements, all of which act simultaneously upon said blank in producing a series of grooves, each of said grooves being a counterpart of that developed upon the edge of the former in use while any one series is being made, as will be hereinafter explained. This sectional former is shown more particularly in Figs. 3 and 4, is designated in a general way by 49, and it is shown consisting of a series of plates, each having a working surface conforming to the part of the design to be reproduced from it, said plates being designated each by the numeral 50.

Designated each by the numeral 51 are carrier-plates having hubs or knuckles 52, each of said carrier-plates being perforated and threaded at 53 for the reception of screws 54. Each former is slotted at 55 to permit of its adjustment upon the screws of the carrier-plates, this being important to enable the machine to accommodate blanks of different sizes or to make shallow or deep cuts in said blanks.

Hubs 52 are sleeved one above the other upon a spindle 54, and they may all be clamped together by a nut 56', (see Fig. 4,) and by loosening this nut the formers may be swung around on said spindle to bring the one required into position, or they may remain clamped in place and be brought to the proper location by indexing the blank.

Designated by 57 is a toothed wheel secured to the lower end of the former-carrying spindle 56, and to the lower end of the blank-arbor 33 is also secured a similar toothed wheel 59. To cause the arbors to rotate in unison when one is turned to index the blank and to bring the desired former into position opposite the gage wheel or roller 48, an intermediate gear 60 is mounted on a stud 61 in the web uniting the bearings 32 and 32' of the frame 28, said wheel meshing with the gears 57 and 59, as illustrated in Fig. 1.

In Figs. 6 to 9 a modification of the manner of supporting the formers is illustrated, and in said modification a head 62 is shown, said head having a spindle 63 adapted to be inserted in the socket in the top of the shaft 58, said spindle being clamped in position by a screw 64. In this form of the invention formers 65 are shown secured to plates 66, the latter being slotted at 66' for the reception of screws 67 and each plate having a vertical flange $66^2$, to which the former is attached by screws 68. By loosening the screws 67 the plate to which the former is secured may be adjusted to position the former carried thereby properly with relation to the work to be accomplished. This construction provides a flat base on which the formers are adjustably mounted.

In Fig. 3 the glass to be cut is shown as of irregular contour, and the complete design to be reproduced thereon is represented by the sectional former 49, each section of said former having the outline of part of the complete design.

A handle 70 is secured to the bearing 32 for a purpose hereinafter stated.

In operation the improved machine works as follows: A blank 35 being suitably secured to the spindle and the desired former for the part of the design to be cut being in place opposite the roller 48, the tool 44 is rotated by a belt applied to the pulley 43, and an operator then grasps the handle 70 with his right hand and pushes with the other hand against one of the arms 24, thus bringing the ledge or stop $b$ of the pattern in use into contact with the roller, the position of which is such as to permit the tool to just clear the blank. By now swinging the frame 28 around its trunnions the blank will be rolled in front of the tool in conformity to the shape of the pattern then in use, and said tool will cut into the glass and will again clear it when the ledge or stop $a$ on said former engages the roller 48. By now indexing the blank-arbor 33 until the detent 37 enters the next notch of the plate 36 (this action causing the gearing 57, 59, and 60 to be rotated and to impart a simultaneous indexing movement to the former 49) a blank is turned to bring a new part thereof opposite the tool, and the operation will then be repeated, the tool making a second cut in the blank conforming to the part of the design represented by the former-section then in use, and so on until all the outlines represented by the various formers have been reproduced on the blank. When a design of another kind is required, the former in use is replaced by another having patterns conforming to said design, and by again changing these formers it will be seen that any desired ornament may be produced on the blank. Generally a number of cuts are made in producing the multiple representations of each former-blade; but, if desired, said representations may be made at a single operation.

Any desired cutting, buffing, or polishing implements may be employed in operating upon the blank, the invention not being limited to the grinding-disks shown.

Changes may be made in the form and proportions of the parts, and they may be variously arranged in a manner different from that illustrated without departure from the invention.

Other means for supporting and indexing the blank may also be employed, and the invention is not restricted to any specific use, for it may be utilized in various arts.

Having thus described my invention, what I claim is—

1. In a machine of the class described, a former having a number of separated contour-surfaces, each conforming to a part of a design to be reproduced.

2. In a machine of the class described, a former composed of sections, each section having a contour conforming to a part of a design to be reproduced.

3. In a machine of the class described, the combination, with a carrier, of a former mounted on said carrier and composed of a number of different portions, each having the contour of part of a complete design.

4. In a machine of the class described, the combination, with a carrier, of a sectional former secured to said carrier each section of the former having a contour from which part of a complete design is reproduced; means for securing the sections of the former to the carrier; and means for indexing the former.

5. The combination, with a rotary carrier, of a former composed of sections, each section representing part of a design to be formed; a blank-support; means for simultaneously indexing the blank-support and the former; and means for producing a series of cuts in the blank.

6. The combination, with a blank-support, of means for so sustaining said blank-support that it may have a rolling and swinging action; a tool against which the blank is rolled in producing the cut; a former composed of sections, each section representing a part of the design to be reproduced; and means for indexing the former and blank-support.

7. The combination, with a rotary shaft, of a sectional former secured to said shaft, each section of the former representing a part of the complete design to be produced; a blank-holder; a tool; a stop with which the former coöperates; means for swinging the former and blank-support; and means for imparting a rolling movement to the blank-support against the tool, and also simultaneously therewith a rolling movement of the former against the stop.

8. The combination, with a blank-support, of means for indexing said support; means for swinging the support; means for rocking the support to impart a rolling movement to the blank; a tool composed of sections; a sectional former; means for indexing said former; and a roller with which the sectional former coöperates.

9. The combination, with a shaft, of a sectional former removably connected to said shaft, each section of the former representing a part of the complete design to be produced; a blank-support; means for simultaneously indexing the blank-support and former; a stop-roller with which the former coöperates; a tool; and means for actuating the blank-support toward and from said tool.

10. The combination, with a rotary tool, of a swinging carrier; a blank-support mounted on said carrier; a sectional former also mounted on the carrier, each section of the former representing a part of a design; means for imparting a rolling movement to the blank-support and former; and a stop-roller with which the sectional former coöperates.

11. The combination, with a tool composed of a number of sections, of a blank-support; means for securing a blank to said blank-support; a sectional former; a stop-roller; and means for actuating the former and blank-support toward and from the tool and said stop-roller.

12. In a machine of the class described, the combination, with a former composed of adjustable sections, each section representing a part of a design, of a stop-roller coöperating with said former; a blank-support; means for simultaneously indexing the former and the blank-support; a carrier for the former and blank-support; a tool; and means for swinging the carrier toward and from the tool; and for imparting a rolling movement to the carrier.

13. The combination, with a support, of a sectional former secured to said support, each section of the former having stops and being of different contour from another section; of a roller coöperating with the former; a sectional carrier; a blank-support also mounted on the carrier; a tool for operating upon the blank; and means for imparting a rolling movement to the carrier to carry the blank over the surface of said tool.

14. A former composed of sections, each a counterpart of part of a complete design, each section having a pair of stops, combined with means for supporting said former; and means whereby said sections may be individually adjusted and then clamped in position.

15. A former composed of sections, each representing a part of a design, and devices to which said sections are secured.

16. A former composed of sections each representing a part of a design; supports for said sections; a carrier; and devices whereby the sections may be adjusted.

17. The combination, with a spindle, of plates sleeved upon said spindle, and former-sections connected to the plates.

18. The combination, with a spindle, of plates sleeved thereon; means for securing the plates to the spindle; and former-sections adjustably connected to the plates.

In testimony whereof I affix my signature in presence of two witnesses.

CHARLES B. BISHOP.

Witnesses:
F. E. ANDERSON,
FRANCES E. BLODGETT.